(12) United States Patent
Duggan

(10) Patent No.: US 6,257,041 B1
(45) Date of Patent: Jul. 10, 2001

(54) METHOD OF FORMING A ONE-PIECE STEERING SHAFT MEMBER

(75) Inventor: James A. Duggan, Temperance, MI (US)

(73) Assignee: Spicer Driveshaft, Inc., Holland, OH (US)

( * ) Notice: Subject to any disclaimer, the term of this patent is extended or adjusted under 35 U.S.C. 154(b) by 0 days.

(21) Appl. No.: 09/643,416

(22) Filed: Aug. 22, 2000

Related U.S. Application Data

(60) Division of application No. 08/896,811, filed on Jul. 18, 1997, now Pat. No. 6,105,416, which is a continuation-in-part of application No. 08/366,269, filed on Dec. 29, 1994, now abandoned.

(51) Int. Cl.[7] .................................................. B21C 37/30
(52) U.S. Cl. .................. 72/370.25; 72/370.1; 72/370.23; 29/888.09
(58) Field of Search ............................... 72/367.1, 370.1, 72/370.11, 370.14, 370.23, 370.24, 370.25; 29/888.09

(56) References Cited

U.S. PATENT DOCUMENTS

| | | |
|---|---|---|
| 2,227,436 | 1/1941 | Buckwalter . |
| 3,486,349 | 12/1969 | Ritsema . |
| 3,566,651 | 3/1971 | Tlaker . |
| 3,804,467 | 4/1974 | Austermann . |
| 4,095,450 | 6/1978 | Opland et al. . |
| 4,213,351 | 7/1980 | Rowlinson . |
| 4,601,215 | 7/1986 | Barnabe et al. . |
| 4,602,520 | 7/1986 | Nishikawa et al. . |
| 4,738,154 | 4/1988 | Hancock . |
| 4,781,054 | 11/1988 | Brown et al. . |
| 4,833,936 | 5/1989 | Mariani et al. . |
| 5,464,251 | 11/1995 | Castellon . |
| 5,771,737 * | 6/1998 | Yaegashi .................................. 72/356 |
| 5,836,823 * | 11/1998 | Shellaberger ......................... 464/134 |
| 6,038,901 * | 3/2000 | Stein et al. ......................... 72/370.25 |

FOREIGN PATENT DOCUMENTS

| | | |
|---|---|---|
| 33 35 912 A1 | 4/1985 | (DE) . |
| 0 612 649 | 8/1994 | (EP) . |
| 2 679 860 | 2/1993 | (FR) . |
| 2 091 141 | 7/1982 | (GB) . |
| 59-24547 * | 2/1984 | (JP) . |
| 61-166769 | 7/1986 | (JP) . |
| 6-39473 * | 2/1994 | (JP) . |

* cited by examiner

*Primary Examiner*—Ed Tolan
(74) *Attorney, Agent, or Firm*—MacMillan, Sobanski & Todd, LLC

(57) ABSTRACT

A method for forming a one-piece steering shaft member, such as an externally splined male steering shaft member (or yoke shaft) or an internally splined female steering shaft member (or slip yoke) is disclosed. A hollow cylindrical tube is initially provided which is preferably formed from a blank of a metallic material, such as aluminum, having an elongation factor of at least fifteen percent. It is desirable that the tube have a uniform wall thickness and define an outer diameter which is substantially uniform along the length thereof. The outer diameter of one end of the tube is reduced from its original diameter while the outer diameter of the opposite end is maintained at its original diameter. A splined surface is formed in the reduced diameter end portion of the tube. The splined surface is formed on the external surface of the yoke shaft and on the internal surface of the slip yoke. A yoke member is then formed in the opposite end of the tube. In one embodiment, the opposite end of the tube is first deformed so as to provide a generally hollow rectangular cross sectional shape. Generally U-shaped portions of material are removed from two of the opposed sides of the hollow rectangular end of the tube to form a pair of opposed yoke ears adapted for use in a universal joint. In a second embodiment, the opposite end is maintained in its original hollow cylindrical shape and is machined to form the opposed yoke arms. In both embodiments, a bore is formed through each of the yoke ears.

3 Claims, 5 Drawing Sheets

METHOD OF FORMING A ONE-PIECE STEERING SHAFT MEMBER

CROSS-REFERENCE TO RELATED APPLICATIONS

This application is a division of U.S. Ser. No. 08/896,811, filed Jul. 18, 1997, now U.S. Pat. No. 6,105,413 issued Aug. 22, 2000, which was a continuation-in-part of application Ser. No. 08/366,269 filed Dec. 29, 1994, now abandoned.

BACKGROUND OF THE INVENTION

This invention relates in general to vehicular steering shaft assemblies and in particular to a method of manufacturing a one-piece steering shaft member.

In virtually every vehicle in use today, a steering system is provided for permitting a driver to control the direction of movement. A typical steering system includes a steering wheel, a steering shaft assembly, and a steering device. The steering wheel is rotatably supported within a driver compartment of the vehicle for movement by a driver. The steering shaft assembly is connected at one end to the steering wheel for rotation therewith. The other end of the steering shaft assembly is connected to the steering device for turning the wheels of the vehicle in response to rotation of the steering wheel. In its simplest form, the steering shaft assembly is embodied as a single shaft or tube having a pair of yokes mounted on the ends thereof. The yokes are usually connected by respective universal joints to the steering wheel and the steering device.

In many vehicles, the steering shaft assembly is designed not only to provide a rotational driving connection between the steering wheel and the steering device, but also to permit relative axial movement therebetween. Such relative axial movement allows for manufacturer build tolerance, installation, and relative body movement. To accomplish this, it is known to construct the steering shaft assembly from cooperating male and female steering shaft members. The male and female steering shaft members cooperate by means of respective external and internal splines. The telescoping splined connection provides a rotatable driving connection between the steering wheel and the steering device, while permitting relative axial movement.

In the past, the male steering shaft member (often referred to as the yoke shaft) was formed from an externally splined steel shaft having a steel yoke welded to the outer end thereof. Similarly, the female steering shaft member (often referred to as the slip yoke) was formed from a hollow steel tube having a steel yoke welded to the outer end thereof. The manufacture of these well known male and female steering shaft members thus required one or more welding operations and, consequently, was relatively expensive. Also, relatively extensive process controls and inspection procedures were often required to insure the integrity of the welded components. Thus, it would be desirable to provide an improved method for manufacturing a yoke shaft and a slip yoke for a vehicle steering shaft assembly which is relatively simple and inexpensive.

SUMMARY OF THE INVENTION

This invention relates to an improved method for forming a one-piece steering shaft member, such as an externally splined male steering shaft member (or yoke shaft) or an internally splined female steering shaft member (or slip yoke). A hollow cylindrical tube is initially provided which is preferably formed from a blank of a metallic material, such as aluminum, having an elongation factor of at least fifteen percent. It is desirable that the tube have a uniform wall thickness and define an outer diameter which is substantially uniform along the length thereof The outer diameter of one end of the tube is reduced from its original diameter relative to the opposite end. A splined surface is formed in the reduced diameter end portion of the tube. The splined surface is formed on the external surface of the yoke shaft and on the internal surface of the slip yoke.

A yoke member is then formed in the opposite end of the tube. In one embodiment, the opposite end of the tube is first deformed so as to provide a generally hollow rectangular cross sectional shape. This can be done in such a manner as to provide uniform wall thicknesses for all four of the sides of the hollow rectangular end of the tube. Alternatively, a first pair of opposed sides of the hollow rectangular end of the tube may be formed having a first wall thickness, while a second pair of opposed sides may be formed having a second wall thickness different from the first wall thickness. U-shaped portions of material are then removed from two of the opposed sides of the hollow rectangular end of the tube to form a pair of opposed yoke cars.

In a second embodiment, the opposite end is maintained in its original hollow cylindrical shape and is machined to form the opposed yoke arms of the yoke member. In a third embodiment, a hollow tube is provided having a diameter which is uniform along the length thereof. The outer diameter of the entire tube is reduced a predetermined amount and the outer diameter of a portion of the tube, including one end, is further reduced an additional predetermined amount. In this third embodiment, the splined surface is formed in the end which has been reduced the additional amount while the yoke member is formed in the less reduced, opposite end.

In all embodiments, a bore is stamped, drilled, or otherwise formed through each of the yoke ears. The square corners of the yoke ears may be rounded off in the step where the yoke member is initially formed or in a subsequent step. In addition, the finished steering shaft member may be heat treated in a conventional manner if necessary.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
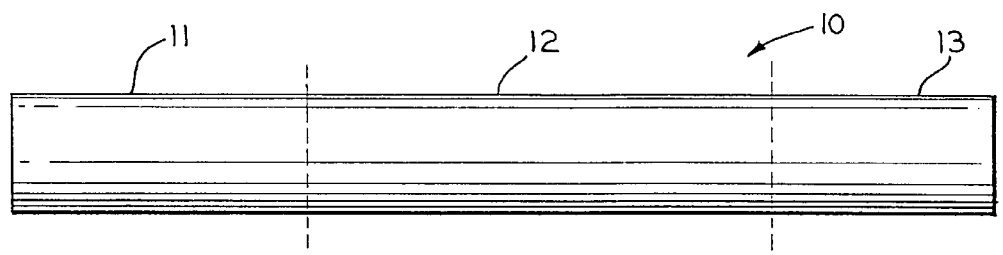
FIGS. 1 through 4, 7, and 8 are side elevational views showing various steps in a method of forming of a yoke shaft in accordance with the method of this invention.

Referring now to the drawings, there is illustrated a method for forming a one-piece steering shaft member in accordance with this invention. FIGS. 1 through 8 illustrate the method in the context of the formation of an externally splined male steering shaft member (or yoke shaft), while FIGS. 9 through 15 illustrate the method in the context of the formation of an internally splined female steering shaft member (or slip yoke). Each of these steering shaft members includes two ends, namely, a splined end and a yoke end. The splined end of the yoke shaft has external splines, while the splined end of the slip yoke has internal splines. The yoke ends of both the yoke shaft and the slip yoke are adapted to be connected to respective universal joints to facilitate connection to either the steering wheel or the steering device of the vehicle, as discussed above. Although the method illustrated and described herein provides for the initial formation of the splined end of the steering shaft member, followed by the subsequent formation of the yoke end of the steering shaft member, it will be appreciated that this sequence may be reversed if desired.

Referring now to FIGS. 1 through 8, the method of manufacturing a one-piece yoke shaft in accordance with this invention is illustrated. As shown in FIG. 1, a hollow cylindrical tube, indicated generally at 10, is initially provided. The tube 10 is preferably formed from a blank of a metallic material having an elongation factor of at least fifteen percent. For example, the tube 10 may be formed of 6061-T4 aluminum. It is desirable that the tube 10 have a uniform wall thickness and define an outer diameter which is substantially uniform along the length thereof For the purpose of illustrating the steps in the method of this invention, the tube 10 may be viewed as being divided into a first portion 11, a second portion 12, and a third portion 13, as shown by the dotted lines in FIGS. 1 through 8.

Figure 2:
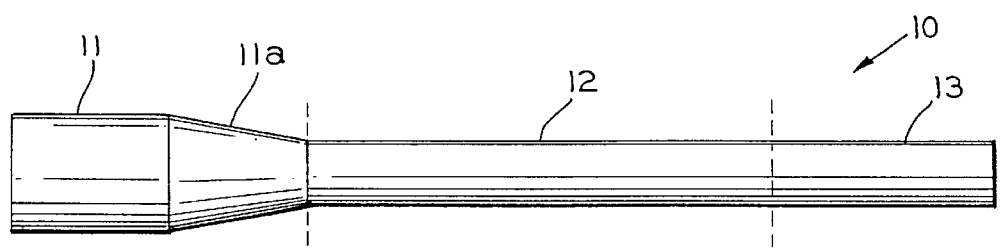

The second step in the method of this invention is to reduce the outer diameter of both the second portion 12 and the third portion 13 of the tube 10, as shown in FIG. 2. This reduction in diameter can be accomplished by any known metal forming operation, preferably feed swaging. The first portion 11 of the tube 10, however, is preferably maintained at the original first outer diameter thereof. The reduced outer diameter of the second portion 12 and the third portion 13 of the tube 10 is preferably uniform and is roughly equal to the desired minor outer diameter of the splined end portion of the finished yoke shaft, as will be explained below. A tapered transition section 11a is thus provided between the first portion 11 and the second portion 12 of the tube 10.

Figure 3:
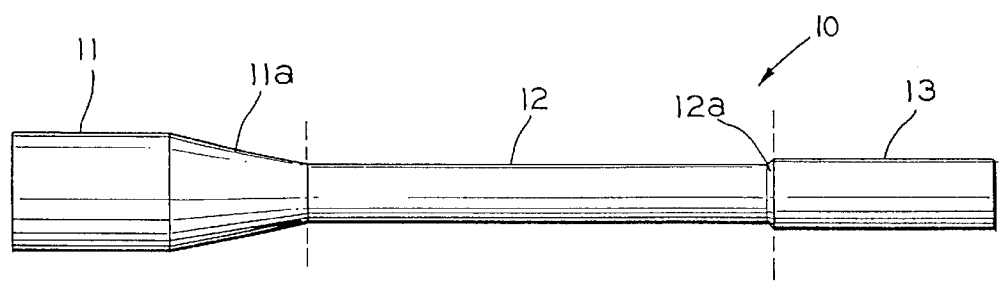

Next, the second portion 12 of the tube 10 is subjected to a further outer diameter reducing process, as shown in FIG. 3. This further reduction in diameter can also be accomplished by any known metal forming operation, preferably recess swaging. Again, the first portion 11 of the tube 10 is preferably maintained at the original first outer diameter thereof. Preferably, the wall thickness of the second portion 12 of the tube 10 remains essentially unchanged from the wall thickness of the third portion 13 of the tube. As a result, the outer diameter of the second portion 12 is smaller than the outer diameter of the third portion 13, and the outer diameter of the third portion 13 is smaller than the outer diameter of the first portion 11. The second portion 12 of the tube 10 has a uniform outer diameter and has a smooth outer surface to provide a suitable sealing surface for an elastomeric seal (not shown), such as is typically provided on a mating slip yoke, as will be described in further detail below. A tapered transition section 12a is thus provided between the second portion 12 and the third portion 13 of the tube 10. It should be noted that the relative sizes of any portion of the one-piece yoke shaft may be modified to be either larger or smaller in accordance with this invention. For example, the transition section 12a may be longer in length than is illustrated in FIGS. 3, 4, 7, 8, 17 and 18. Similarly, other portions such as the first portion 11, the second portion 12, the third portion 13, and any transition section formed therebetween such as 11a or 12a, may be made larger or smaller in axial length or cross section relative to the remaining portions than is illustrated.

Figure 4:
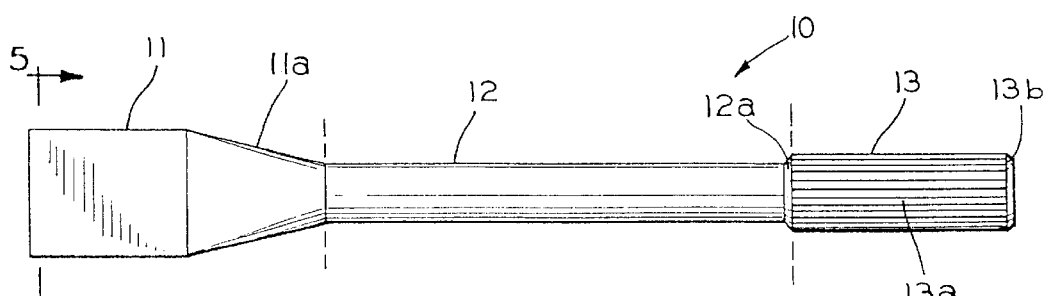

Following this step, a splined surface 13a is formed in the exterior surface of the third portion 13 of the tube 10, as shown in FIG. 4. Preferably, such splined surface 13a is formed by deforming the third portion 13 of the tube 10 with a conventional push-pointing operation. Alternatively, the splined surface 13a may be formed on the third portion 13 of the tube 10 by a conventional spline rolling machine or milling operation. It has been found that the splined surface 13a can be formed more easily if the first portion 11 of the tube 10 is maintained in its original hollow cylindrical shape which facilitates the insertion of the tube 10 in the spline rolling or swaging machine. The outer surface of the axial end of the third portion 13 of the tube 10 may then be chamfered, as shown at 13b.

Figure 5:
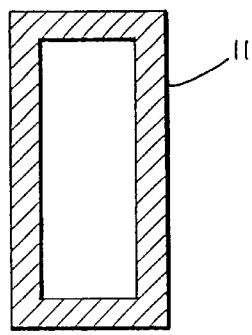
FIG. 5 is an enlarged sectional elevational view of a portion of the tube taken along the line 5—5 of FIG. 4.
Figure 6:
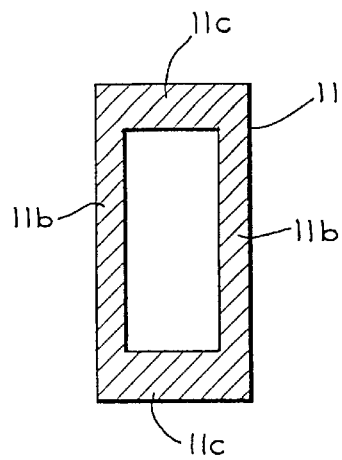
FIG. 6 is an enlarged sectional elevational view similar to FIG. 5 showing an alternative structure for the tube.

The first portion 11 of the tube 10 is then deformed so as to provide a generally hollow rectangular cross sectional shape. This can be done in such a manner as to provide uniform wall thicknesses for all four of the sides of the hollow rectangular first portion 11 of the tube 10, as shown in FIG. 5. However, as shown in FIG. 6, a first pair 11b of opposed sides of the hollow rectangular first portion 11 of the tube 10 may be formed having a first wall thickness, while a second pair 11c of opposed sides of the hollow rectangular first portion 11 of the tube 10 may be formed having a second wall thickness different from the first wall thickness. The formation of the first portion 11 of the tube 10 in this manner can be accomplished by a two-step process. First, the first portion 11 of the tube 10 is initially swaged with circular dies over a mandrel having a rectangular cross sectional shape such that the interior of the first portion 11 is deformed to have the rectangular cross sectional shape, while the exterior of the first portion 11 retains the generally circular cross sectional shape. Then, the first portion 11 of the tube 10 is swaged with rectangular dies over the same mandrel such that the exterior of the first portion is deformed to have the rectangular cross sectional shape.

Figure 7:
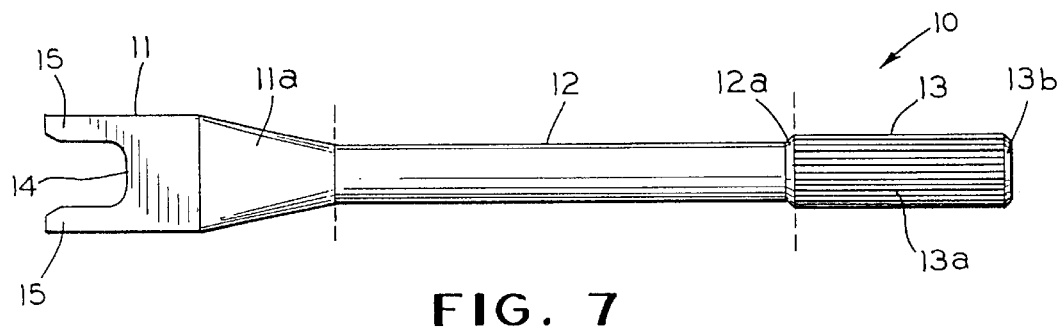

As shown in FIG. 7, a portion of material is next removed from two of the opposed sides of the first portion 11 of the tube 10. The portions of material which are removed are preferably generally U-shaped or V-shaped, leaving respective opposed recesses 14 formed in the opposed sides of the first portion 11 of the tube 10. The portions of material may be removed by any suitable means, such as by stamping or milling. If the wall thicknesses of the two pairs of opposed sides 11b and 11c are different, such as shown in FIG. 6, it is preferred that the portions of material be removed from the pair of opposed sides 11b having the smaller wall thickness. In any event, the remaining pair of opposed sides thus define opposed yoke ears 15 adapted for use in a universal joint. Preferably, the yoke arms 15 are formed having rounded corners during this step.

Figure 8:
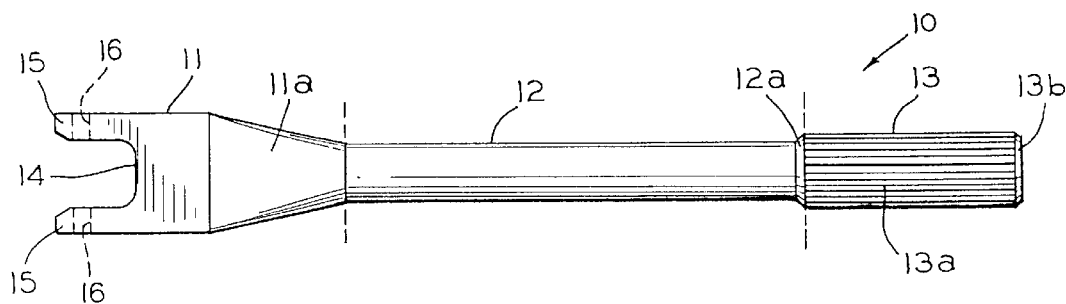

Lastly, as shown in FIG. 8, a bore 16 is formed through each of the yoke ears 15. The bores 16 are co-axially aligned and may be formed by any suitable means, such as by drilling or punching. If not performed previously, any remaining square corners of the yoke ears 15 may be rounded off as necessary. The finished yoke shaft may be heat treated in a conventional manner if necessary.

Figure 9:
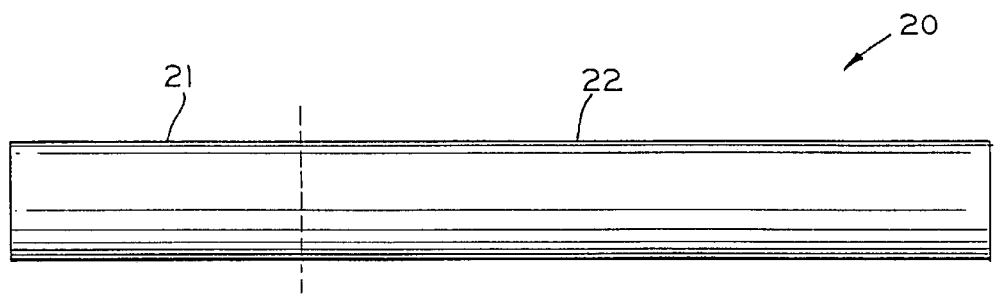
FIGS. 9 through 11, 14, and 15 are side elevational views showing various steps in a method of forming of a yoke shaft in accordance with the method of this invention.

Referring now to FIGS. 9 through 15, the method of manufacturing a one-piece slip yoke in accordance with this invention is illustrated. As shown in FIG. 9, a hollow cylindrical tube, indicated generally at 20, is initially provided. The tube 20 is preferably formed from a blank of a metallic material having an elongation factor of at least fifteen percent. For example, the tube 20 may be formed of 6061-T4 aluminum. It is desirable that the tube 20 have a uniform wall thickness and define an outer diameter which is substantially uniform along the length thereof. For the purpose of illustrating the steps in the method of this invention, the tube 20 may be viewed as being divided into a first portion 21 and a second portion 22, as shown by the dotted lines in FIGS. 9 through 15.

Figure 10:
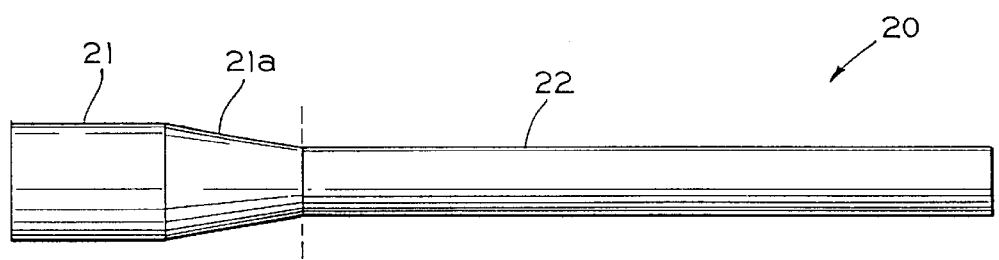

The second step in the method of this invention is to reduce the outer diameter of the second portion 22 of the tube 20, as shown in FIG. 10. This reduction in diameter can be accomplished by any known metal forming operation, preferably feed swaging. The first portion 21 of the tube 20, however, is preferably maintained at the original first outer diameter thereof. Preferably, the wall thickness of the second portion 22 of the tube 20 remains roughly the same as its original wall thickness. The reduced outer diameter of the second portion 22 of the tube 20 is preferably uniform and is approximately equal to the desired outer diameter of the splined end portion of the finished slip yoke, as will be explained below. A tapered transition section 21a is thus provided between the first portion 21 and the second portion 22 of the tube 20.

Figure 11:
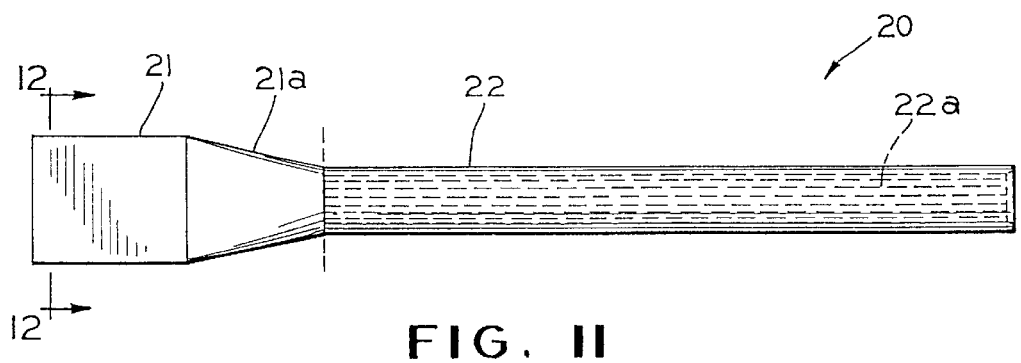

Next, a plurality of splines, shown in dotted lines at 22a, are formed in the interior surface of the second portion 22 of the tube 20, as shown in FIG. 11. Preferably, such splines 22a are formed by deforming the second portion 22 of the tube 20 about a splined mandrel. This can be done at the same time that the second portion 22 of the tube 20 is reduced in diameter, as described above. The inner surface of the axial end of the second portion 22 of the tube 20 may be chamfered, as shown at 22b, at the same time. Similarly to the one-piece yoke shaft, the relative sizes of any portion of the one-piece slip yoke (e.g. the first portion 21, the second portion 22, and the transition section 21a formed therebetween) may be modified to be either larger or smaller in axial length or cross section relative to the remaining portions than is illustrated.

Figure 12:
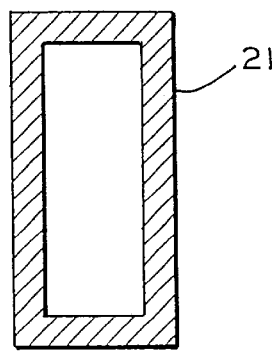
FIG. 12 is an enlarged sectional elevational view of a portion of the tube taken along the line 12—12 of FIG. 11.
Figure 13:
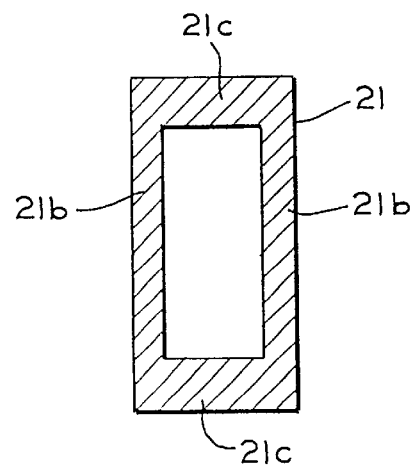
FIG. 13 is an enlarged sectional elevational view similar to FIG. 12 showing an alternative structure for the tube.

The first portion 21 of the tube 20 is then deformed so as to provide a generally hollow rectangular cross sectional shape. This can be done in such a manner as to provide uniform wall thicknesses for all four of the sides of the hollow rectangular first portion 21 of the tube 20, as shown in FIG. 12. However, as shown in FIG. 13, a first pair 21b of opposed sides of the hollow rectangular first portion 21 of the tube 20 may be formed having a first wall thickness, while a second pair 21c of opposed sides of the hollow rectangular first portion 21 of the tube 20 may be formed having a second wall thickness different from the first wall thickness. The formation of the first portion 21 of the tube 20 in this manner can be accomplished in the same manner as described above with respect to the first portion 11 of the tube 10 of the yoke shaft.

Figure 14:
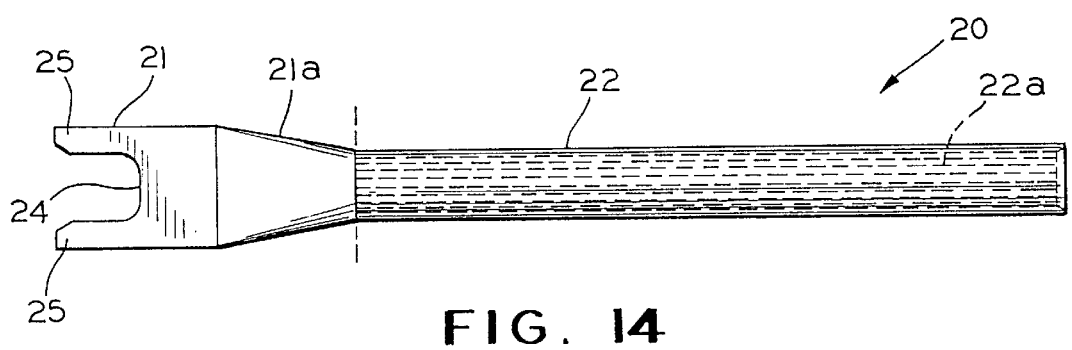
Figure 15:
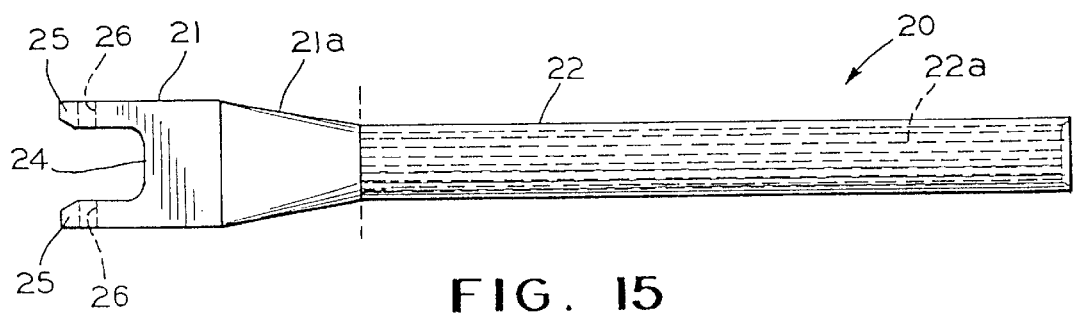

As shown in FIG. 14, a portion of material is next removed from two of the opposed sides of the first portion 21 of the tube 20. The portions of material which are removed are preferably generally U-shaped or V-shaped, leaving respective opposed recesses 24 formed in the opposed sides of the first portion 21 of the tube 20. The portions of material may be removed by any suitable means, such as by stamping or milling. If the wall thicknesses of the two pairs of opposed sides 21b and 21c are different, such as shown in FIG. 14, it is preferred that the portions of material be removed from the pair of opposed sides 21b having the smaller wall thickness. In any event, the remaining pair of opposed sides thus define opposed yoke ears 25. Preferably, the yoke arms are initially formed having rounded corners. Lastly, as shown in FIG. 15, a bore 26 is formed through each of the yoke ears 25. The bores 26 are co-axially aligned and may be formed by any suitable means, such as by drilling or punching. Any remaining square corners of the yoke ears 25 may be rounded off, if necessary. The finished slip yoke may be heat treated in a conventional manner if necessary.

Figure 16:
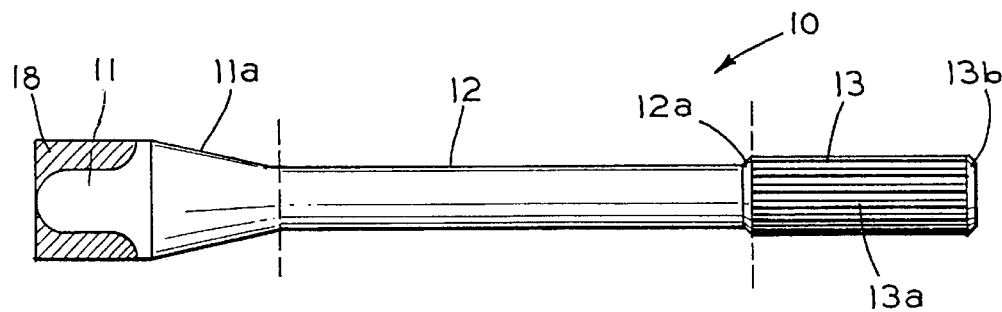
FIGS. 16, 17, and 18 are side elevational views showing an alternative portion of the methods illustrated in FIGS. 1 through 15.
Figure 17:
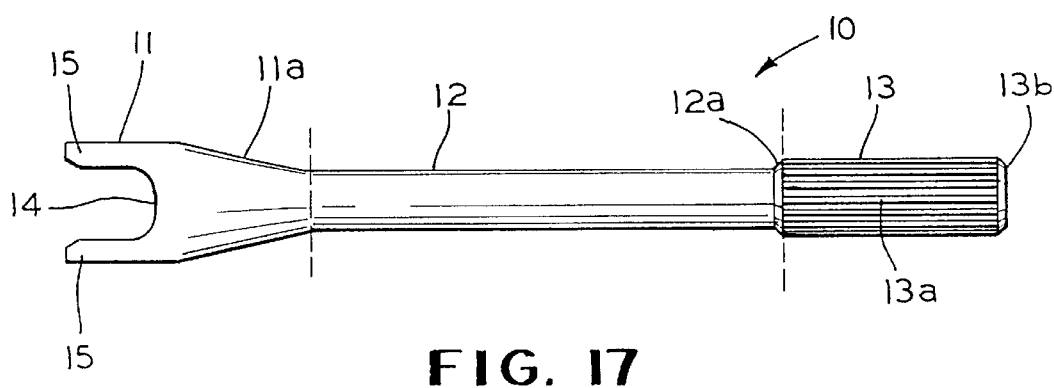
Figure 18:
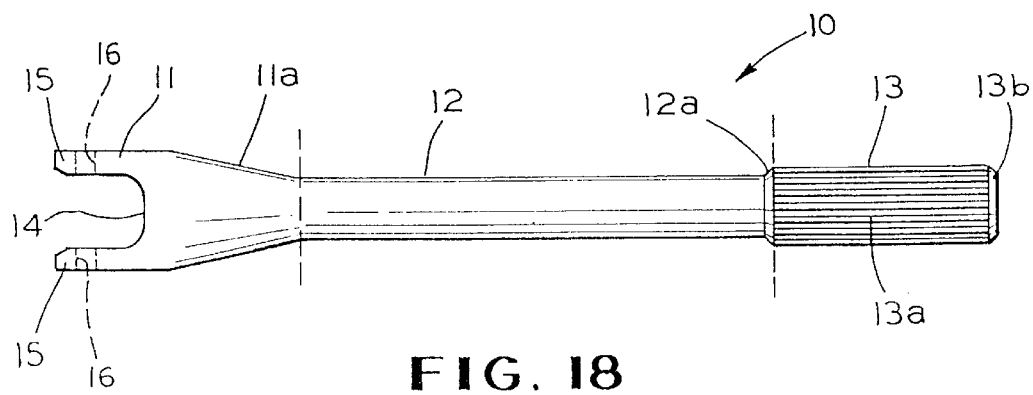

Referring now to FIGS. 16 through 18, an alternative portion of the method of manufacturing either the one-piece yoke shaft or the one-piece slip yoke in accordance with this invention is illustrated. For simplicity purposes only, this second embodiment of the inventive method is described with respect to only the yoke shaft. It should be appreciated, however, that this portion of the inventive method is applicable to the formation of a slip yoke as well.

In the embodiment illustrated in FIGS. 16 through 18, the yoke shaft is formed according to the steps as described previously and illustrated in FIGS. 1 through 3. In the next step as shown in FIG. 16, the splined surface 13a is similarly formed in the exterior surface of the third portion 13 of the tube 10. Again, the splined surface 13a is preferably formed by deforming the third portion 13 of the tube 10 with a conventional push-pointing operation but may be alternatively formed by a conventional spline rolling machine or milling operation. As noted previously, the splined surface 13a can be formed more easily if the first portion 11 of the tube 10 is maintained in its original hollow cylindrical shape which facilitates the insertion of the tube 10 in the spline rolling or swaging machine. The outer surface of the axial end of the third portion 13 of the tube 10 may then be chamfered, as shown at 13b.

As shown in FIGS. 16 and 17, the first portion 11 of the tube 10 is maintained in its original hollow cylindrical shape and is machined to form the yoke arms 15 of the yoke member. As shown therein, generally U-shaped or V-shaped portions 18 are removed leaving opposed yoke arms 15 which define opposed recesses 14 in the first portion 11 of the tube 10. Preferably, the yoke arms 15 are formed during this step to have rounded corners as best shown in FIG. 16. The portions of material 18 may be removed by milling, broaching, stamping or any other suitable process.

In the last step of this alternative method, a bore 16 is formed through each of the yoke ears 15. The bores 16 are co-axially aligned and may be formed by any suitable means, such as by drilling or punching. If not performed in the previous step, the square corners of the yoke ears 15 may be rounded off, as necessary. The finished yoke shaft may be heat treated in a conventional manner if necessary.

As noted above, the portion of the method described above with respect to FIGS. 16 through 18 may be similarly applied to the first portion 21 of the tube 20 used to form the slip yoke (thereby, replacing the steps as illustrated in FIGS. 11 through 15 as applied to the first portion 21.)

In a third embodiment of this invention, the uniform outer diameter of the hollow tube as shown in FIGS. 1 and 9 is reduced a predetermined amount along its entire length. Next, a portion of the hollow tube including one end (e.g. portions 12 and 13 as shown in FIG. 1 and portion 22 as shown in FIG. 9) is further reduced an additional predetermined amount as shown in FIGS. 2 and 10. The remaining steps of this embodiment of the invention are performed as described above in accordance with either the first or second embodiment.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of forming a one-piece shaft and yoke member comprising the steps of:
   (a) providing a tube including a first portion and a second portion extending from the first portion, the tube having a generally circular cross sectional shape including an outer surface defining a first outer diameter and an inner surface;
   (b) subjecting the second portion of the tube to a diameter reducing process such that the second portion of the tube continues to have a generally circular cross sectional shape including an outer surface defining a second outer diameter that is smaller than the first outer diameter and an inner surface;
   (c) forming a yoke on the first portion of the tube and a splined surface on the inner surface of the second portion of the tube to form the one-piece shaft and yoke member.

2. The method defined in claim 1 wherein said step (b) is performed such that a tapered transition section is provided between said first and second portions of said tube.

3. The method defined in claim 1 wherein said step (c) is performed such that said portions of said first portion of said tube are removed to formed said yoke.

* * * * *